(12) United States Patent
Hua et al.

(10) Patent No.: US 11,256,428 B2
(45) Date of Patent: Feb. 22, 2022

(54) SCALING RAID-BASED STORAGE BY REDISTRIBUTING SPLITS

(71) Applicant: EMC IP HOLDING COMPANY LLC, Hopkinton, MA (US)

(72) Inventors: Kuolin Hua, Natick, MA (US); Kunxiu Gao, Boxborough, MA (US); Evgeny Malkevich, Newton, MA (US)

(73) Assignee: Dell Products L.P., Hopkinton, MA (US)

( * ) Notice: Subject to any disclaimer, the term of this patent is extended or adjusted under 35 U.S.C. 154(b) by 161 days.

(21) Appl. No.: 16/508,762

(22) Filed: Jul. 11, 2019

(65) Prior Publication Data
US 2021/0011640 A1    Jan. 14, 2021

(51) Int. Cl.
    G06F 3/06    (2006.01)

(52) U.S. Cl.
    CPC .......... G06F 3/0632 (2013.01); G06F 3/0607 (2013.01); G06F 3/0644 (2013.01); G06F 3/0659 (2013.01); G06F 3/0689 (2013.01)

(58) Field of Classification Search
    CPC .... G06F 3/0607; G06F 3/0632; G06F 3/0644; G06F 3/0659; G06F 3/0689
    See application file for complete search history.

(56) References Cited

U.S. PATENT DOCUMENTS

| | | | | |
|---|---|---|---|---|
| 5,502,836 A * | 3/1996 | Hale | ................... | G06F 11/1096 369/44.27 |
| 5,809,224 A * | 9/1998 | Schultz | ................. | G06F 3/0626 714/6.32 |
| 6,836,832 B1 * | 12/2004 | Klinkner | ............... | G06F 3/0605 711/170 |
| 7,711,897 B1 * | 5/2010 | Chatterjee | ........... | G06F 12/0868 711/114 |
| 9,641,615 B1 * | 5/2017 | Robins | ................ | G06F 11/1076 |
| 9,690,660 B1 * | 6/2017 | Robins | .............. | G06F 16/24578 |
| 10,365,845 B1 * | 7/2019 | Foley | ...................... | G06F 3/064 |
| 2002/0078276 A1 * | 6/2002 | Hung | .................. | G06F 11/1076 710/74 |
| 2004/0078642 A1 * | 4/2004 | Nanda | ................. | G06F 11/1076 714/6.12 |
| 2005/0235128 A1 * | 10/2005 | Rustagi | ................ | G06F 3/0605 711/170 |
| 2006/0277361 A1 * | 12/2006 | Sharma | .................. | G06F 3/067 711/114 |
| 2007/0101058 A1 * | 5/2007 | Kinnan | ................ | G06F 3/0689 711/114 |
| 2008/0276057 A1 * | 11/2008 | Hetzler | ............... | G06F 11/1096 711/159 |

(Continued)

*Primary Examiner* — Larry T Mackall
(74) *Attorney, Agent, or Firm* — Anderson Gorecki LLP

(57) ABSTRACT

Each drive in a cluster is organized into splits of a single size. The splits are used as protection group members for a selected RAID level. Individual clusters can be scaled up with a number of new drives that is less than the number of protection group members for the RAID level by redistributing some data/parity to splits of the new drives. Splits are selected for redistribution such that new protection groups are created. If the number of new drives is equal to or greater than the number of protection group members for the RAID level, then new clusters may be created using the new drives. Any remaining drives are used to scale-up individual clusters.

17 Claims, 14 Drawing Sheets

(56) References Cited

U.S. PATENT DOCUMENTS

| | | | | |
|---|---|---|---|---|
| 2010/0115210 A1* | 5/2010 | Wicklund | ............ | G06F 3/0689 |
| | | | | 711/154 |
| 2014/0281337 A1* | 9/2014 | Fujita | .................... | G06F 3/0647 |
| | | | | 711/170 |
| 2019/0082010 A1* | 3/2019 | Friedman | .............. | G06F 3/0689 |
| 2020/0348857 A1* | 11/2020 | Kang | ................... | G06F 3/0616 |

* cited by examiner

SCALING RAID-BASED STORAGE BY REDISTRIBUTING SPLITS

TECHNICAL FIELD

The subject matter of this disclosure is generally related to data storage, and more particularly to data storage systems that implement RAIDs (Redundant Arrays of Independent Drives).

BACKGROUND

Large organizations such as banks, large retailers, governments, and multi-national corporations may rely on data centers to maintain data associated with inventory control, accounting, sales, manufacturing, and other critical functions for which avoidance of data loss and maintenance of data availability are important. A key building block of a data center is a storage array. Storage arrays manage access to large data sets that are concurrently used by multiple host applications and potentially many users.

The disk drives that are managed by a storage array may be organized into RAID protection groups to improve data availability and reduce the possibility of data loss in the event of drive failure. Different implementations of RAID use different features such as redundant copies, striping, and parity. Striping reduces latency because accessing n drives in parallel yields up to n times the throughput of accessing a single drive serially. Parity information such as CRC (cyclic redundancy check) enables reconstruction of data and generally requires less storage space than compressed data. RAID-5 uses data striping and distributed parity information. In other words, the drives store both data and parity information. RAID-6 uses two parity stripes on each drive. Regardless of which RAID level is implemented, standby drives can be pre-mounted and automatically utilized in the event of drive failure. More specifically, a failed drive of a RAID can be automatically rebuilt on a standby drive using a redundant copy or parity.

There is sometimes a need to scale-up the storage capacity of a storage array and data center as additional data is created. Storage systems that implement RAID can be scaled-up by adding new protection groups of (R+P) drives where R is the number data drives and P is the number of parity drives. A RAID-5 (4+1) protection group, for example, includes five drives so a storage system that implements RAID-5 (4+1) may be scaled-up in increments of five drives. Similarly, a RAID-5 (3+1) would scale in increments of four drives. Scaling in increments of R+P drives can become problematic as the storage capacity of individual drives increases due to technological advancements. In other words, as commercially available drives store more data and increase in cost, an increment of R+P drives may add significant costly storage capacity that will not be utilized within a reasonable timeframe.

SUMMARY

All examples, aspects and features mentioned in this document can be combined in any technically possible way.

In accordance with some aspects an apparatus comprises: at least one computing node comprising a processor and non-transitory memory; clusters of drives that are managed by the at least one computing node; and computer program code on the non-transitory memory, executed by the processor, comprising: instructions that organize each of the drives into a plurality of splits, wherein each split is a fixed-size amount of storage capacity and all splits have equal storage capacity; instructions that implement a selected RAID (Redundant Array of Independent Drives) level using a first number of the splits as RAID protection group members; instructions that scale RAID storage capacity in response to addition of a second number of new drives, comprising: instructions that add fewer than the first number of the new drives to a selected cluster, comprising: instructions that select splits of drives of the selected cluster and redistribute the selected splits to the fewer than the first number of the new drives added to the selected cluster; and instructions that create at least one new protection group in the selected cluster using at least some splits freed by redistribution of the selected splits to the fewer than the first number of the new drives added to the selected cluster. In some implementations the instructions that scale RAID storage capacity comprise instructions that create at least one new cluster using the first number of the new drives. In some implementations the instructions that create at least one new cluster using the first number of the new drives create a maximum possible number of new clusters from the second number of new drives. In some implementations the instructions that add fewer than the first number of new drives to the selected cluster add only drives remaining from drives allocated for creation of the maximum possible number of new clusters from the second number of new drives. In some implementations the instructions that add fewer than the first number of the new drives to the selected cluster operate to select the cluster to minimizes differences in numbers of drives between clusters. In some implementations the instructions that add fewer than the first number of the new drives to the selected cluster add a single new drive to the selected cluster. In some implementations the selected cluster initially includes conceptual matrices with an upper-left triangle and a lower-right triangle, and after m new drives are added to the selected cluster and splits from the lower-right triangle are redistributed to the m new drives, space is created for m new protection groups in a diagonal conceptual matrix.

In accordance with some aspects a method comprises: organizing individual storage drives into a plurality of splits, wherein each split is a fixed-size amount of storage capacity and all splits have equal storage capacity; implementing a selected RAID (Redundant Array of Independent Drives) level using a first number of the splits as RAID protection group members; scaling RAID storage capacity in response to addition of a second number of new drives, comprising: adding fewer than the first number of the new drives to a selected cluster of drives; selecting splits of drives of the selected cluster and redistributing the selected splits to the fewer than the first number of the new drives added to the selected cluster; and creating at least one new protection group in the selected cluster using at least some splits freed by redistribution of the selected splits to the fewer than the first number of the new drives added to the selected cluster. Some implementations comprise creating at least one new cluster using the first number of new drives. Some implementations comprise creating a maximum possible number of new clusters from the second number of new drives. Some implementations comprise adding to the selected cluster only drives remaining from the second number of new drives minus the new drives allocated for creating the maximum possible number of new clusters from the second number of new drives. Some implementations comprise selecting the cluster to minimize differences in numbers of drives between clusters. Some implementations comprise adding a single new drive to the selected cluster. In some implementations the selected cluster initially includes conceptual matrices with an upper-left triangle and a lower-right triangle and, after m new drives are added to the selected cluster, the method comprises redistributing splits from the lower-right triangle to the m new drives to create space for m new protection groups in a diagonal conceptual matrix.

In accordance with some aspects a scalable storage array comprises: clusters of drives that are each organized into a plurality of splits, wherein each split is a fixed-size amount of storage capacity and all splits have equal storage capacity, a selected RAID (Redundant Array of Independent Drives) level using a first number of the splits as RAID protection group members; and at least one computing node that scales RAID storage capacity in response to addition of a second number of new drives by adding fewer than the first number of the new drives to a selected cluster of drives; selecting splits of drives of the selected cluster and redistributing the selected splits to the fewer than the first number of the new drives added to the selected cluster, and creating at least one new protection group in the selected cluster using at least some splits freed by redistribution of the selected splits to the fewer than the first number of the new drives added to the selected cluster. In some implementations the at least one computing node creates at least one new cluster using the first number of the new drives. In some implementations the at least one computing node creates a maximum possible number of new clusters from the second number of new drives. In some implementations the at least one computing node adds only drives remaining from drives allocated for creation of the maximum possible number of new clusters from the second number of new drives. In some implementations the at least one computing node selects the cluster to minimizes differences in numbers of drives between clusters. In some implementations the at least one computing node adds a single new drive to the selected cluster.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
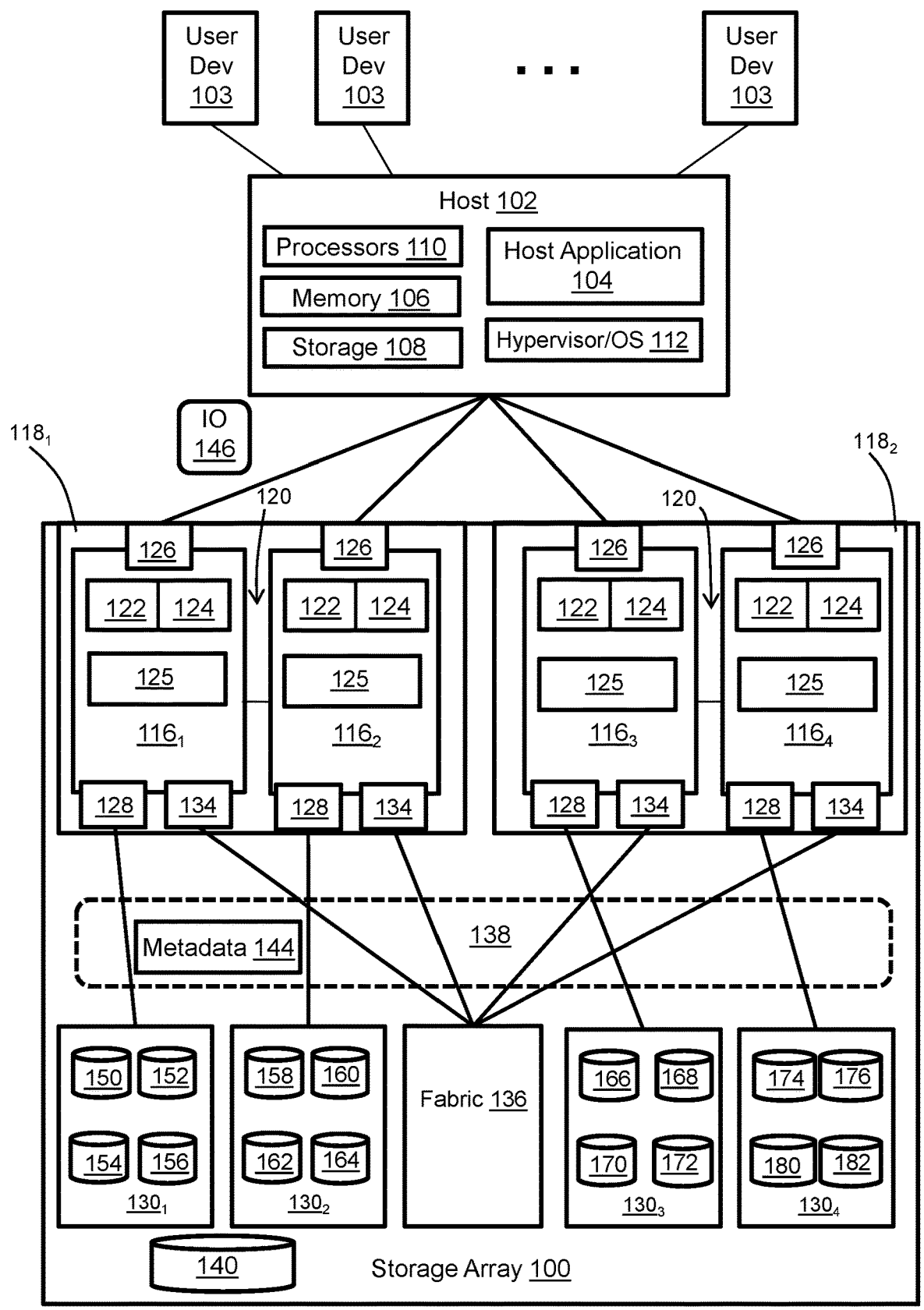
FIG. 1 illustrates a storage array that implements RAID protection groups that can be scaled-up in single drive increments.

FIG. 1 illustrates a storage array 100 that implements RAID protection groups that can be scaled-up in single drive increments. The storage array is depicted in a simplified data center that includes a host 102 and user devices 103. There would typically be multiple hosts and storage arrays in the data center, but the example data center is simplified to facilitate illustration of salient aspects. Each of the hosts that are connected to the storage array, of which host 102 is representative, may support multiple user devices 103. Host 102 may be a type of server computer that includes volatile memory 106, non-volatile storage 108, one or more tangible processors 110, and a hypervisor or OS (Operating System) 112. The volatile memory 106 may include RAM (Random Access Memory) of any type. The non-volatile storage 108 may include drives of one or more technology types, for example, and without limitation, SSDs (Solid State Drives) such as flash, and HDDs (Hard Drive Drives) such as SATA (Serial Advanced Technology Attachment) and FC (Fibre Channel). Although an external host server is illustrated, internal hosts may be instantiated within the storage array. As will be explained in greater detail below, the storage array 100 is scalable at a more granular level than R+P drive increments because RAID protection groups are implemented with splits as members rather than entire drives.

The storage array 100 includes a plurality of interconnected computing nodes $116_1$-$116_4$ that maintain data on, and control access to, clusters 150-176 of managed drives. Each computing node includes at least one multi-core processor 122 and local volatile memory 125. The computing nodes may also include one or more layers of cache. The local volatile memory 125 may include, for example and without limitation, components such as RAM of any type. Each computing node may also include one or more FAs 126 (Front-end Adapters) for communicating with the host 102. Each computing node $116_1$-$116_4$ may also include one or more BAs 128 (Back-end Adapters) for communicating with the managed drives in respective drive array enclosures $130_1$-$130_4$. The managed drives of each cluster 150-176 may include tangible persistent data storage components of one or more technology types, for example, and without limitation, SSDs such as flash and SCM (Storage Class Memory), and HDDs such as SATA and FC. Each drive array enclosure $130_1$-$130_4$ might include 24 or more managed drives, but the figure is simplified for purposes of illustration. Each computing node may also include one or more CAs (Channel Adapters) 134 for communicating with other computing nodes via an interconnecting fabric 136. Each computing node may allocate a portion or partition of its respective local volatile memory 125 to a virtual shared memory 138 that can be accessed by other computing nodes, e.g. via DMA (Direct Memory Access) or RDMA (Remote Direct Memory Access). Pairs of the computing nodes, e.g. ($116_1$, $116_2$) and ($116_3$, $116_4$), may be organized as storage engines $118_1$, $118_2$, respectively, for purposes of failover between computing nodes. The paired computing nodes of each storage engine may be directly interconnected by communication links 120.

One function of the storage array 100 is to maintain data for instances of a host application 104 running on the host 102. Specifically, host application data is maintained on the clusters 150-176 of managed drives. Examples of host applications may include but are not limited to file servers, email servers, block servers, and databases. The managed drives are not discoverable by the host 102 but the storage array 100 maintains a logical storage device 140 that can be discovered and accessed by the host 102. Without limitation, the logical storage device 140 may be referred to as a production volume or production LUN, where LUN (Logical Unit Number) is a number used to identify the logical storage volume in accordance with the SCSI (Small Computer System Interface) protocol. From the perspective of the host 102, the production volume 140 is a single data storage device having a set of contiguous fixed-size LBAs (logical block addresses) on which data used by instances of the host application resides. However, the host application data is stored at non-contiguous addresses on various managed drives that are abstracted by the production volume.

To service IOs from instances of the host application 104 the storage array 100 maintains metadata 144 that indicates, among various things, mappings between LBAs of the production volume 140 and addresses with which extents of host application data can be accessed from the shared memory 138 and managed drives. In response to a data access instruction from an instance of the host application 104, the hypervisor/OS 112 initially determines whether the instruction can be serviced by accessing the host server memory 106. If that is not possible then an IO 146 is sent from the host 102 to the storage array 100. There are multiple paths between the host 102 and the storage array 100, e.g. one path per FA 126. The paths may be selected based on a wide variety of techniques and algorithms including, for context and without limitation, performance and load balancing. In the case of an IO to read data from the production device the storage array uses the metadata 144 to find the requested data in the shared memory 138 or managed drives. More particularly, if the requested data is not in the shared memory 138 then the requested data is temporarily copied into the shared memory from the managed drives and used to service the IO, i.e. reply to the host application with the data via one of the computing nodes. In the case of an IO to write data to the production device the storage array copies the data into shared memory, marks the corresponding production device location as dirty in the metadata, and creates new metadata that maps the production device address with a location to which the data is eventually written on the managed drives. The shared memory may enable the production volume to be reachable via all the computing nodes and paths, although the storage array can be configured to limit use of certain paths to certain production volumes.

Figure 2:
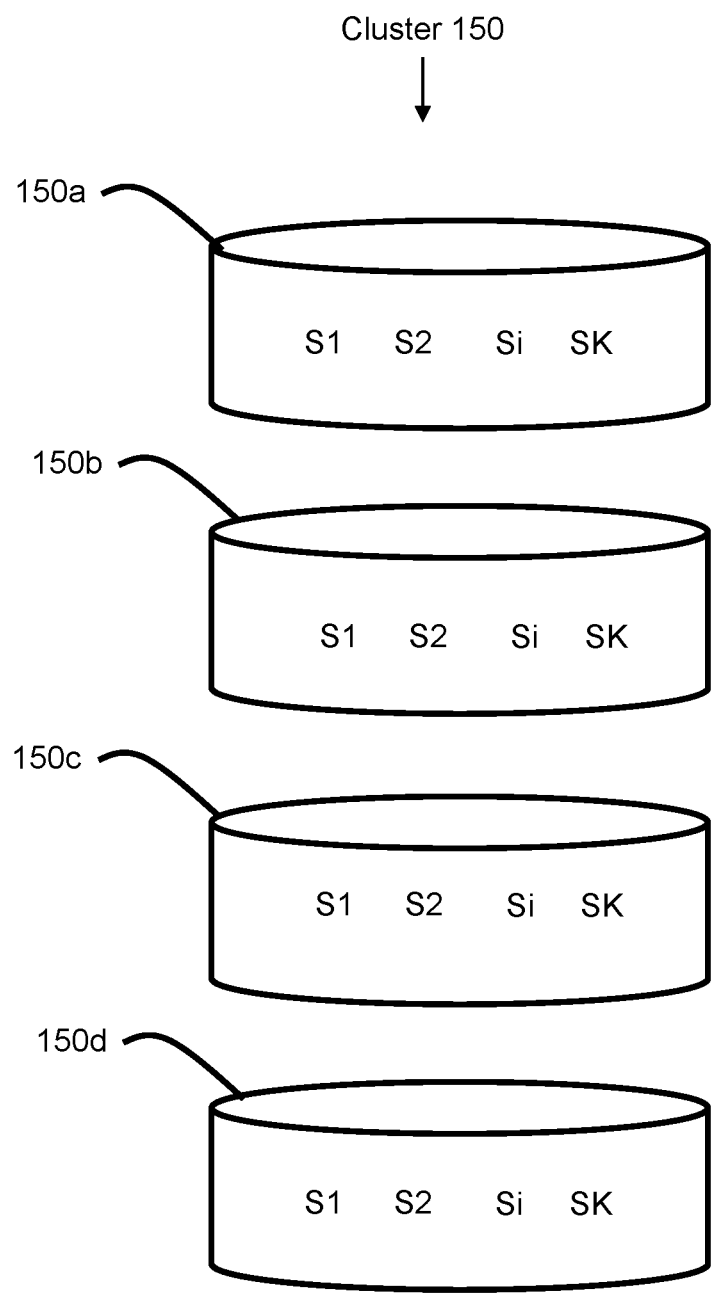
FIG. 2 illustrates implementation of splits on a cluster of managed drives.

FIG. 2 illustrates implementation of splits (collectively $S_x$, where x is an indicia) on a cluster 150 of managed drives 150a, 150b, 150c, and 150d of the storage array 100 of FIG. 1. Each split is a fixed amount of storage capacity that may be defined by a range of addresses or LBAs. Every split in the cluster, and possibly in the storage array, may have the same size in terms of total storage capacity. Each of the managed drives in the cluster may also have the same number of splits. The number of splits per drive may be an integer multiple of the number of members of the RAID level of the protection group being implemented, e.g. M*(R+P), to enable granular array expansion of the cluster by adding a single drive. The cluster may have K drives where initially K=R+P. In the illustrated example the splits of each drive are indexed as S1 through SK, so M=1. Those of ordinary skill in the art will understand that some RAID levels implement members that include both parity and data. References to R+P herein refer to the number of members of the protection group for a given RAID level and thus include members that contain data, parity, and both data and parity.

Figure 3:
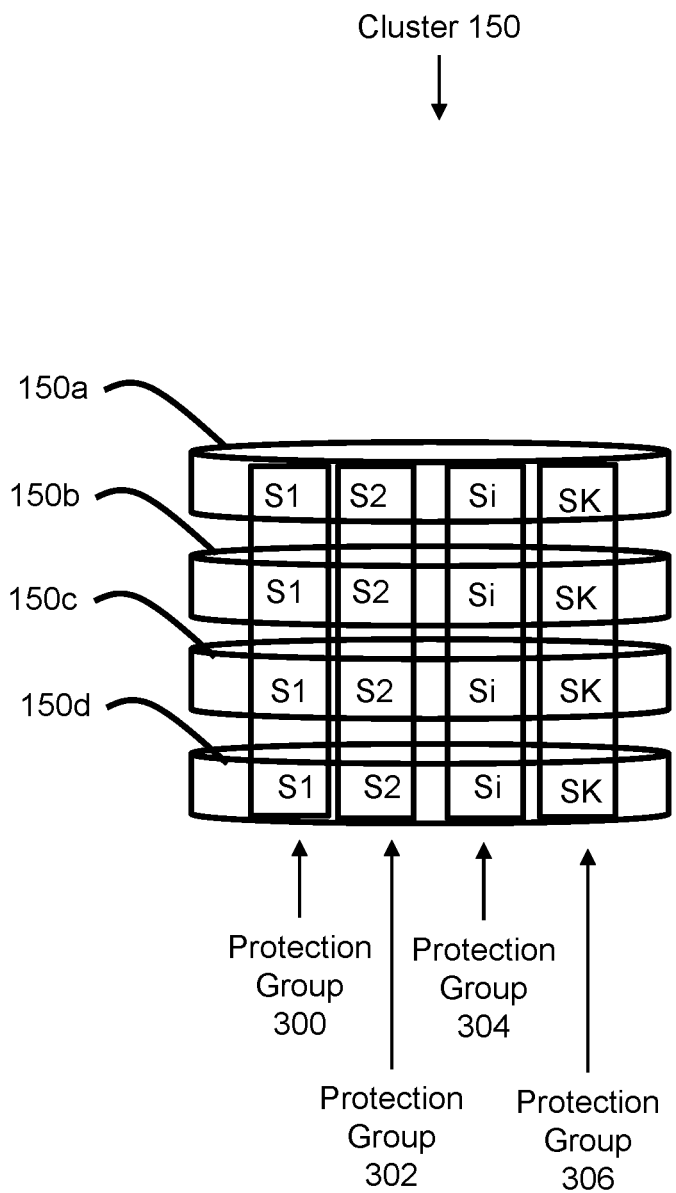
FIG. 3 illustrates organization of the splits of a cluster into RAID-5 (3+1) protection groups.

FIG. 3 illustrates organization of the splits of a cluster 150 into RAID-5 (3+1) protection groups. In one possible implementation K=(R+P)=4 and there are K splits per drive. A first protection group 300 includes the four S1 splits, i.e. one S1-indexed split from each of managed drives 150a through 150d. The four S1 splits may form a RAID-5 (3+1) protection group in which each split is located on a different drive. Similarly, protection groups 302, 304, and 306 of the same RAID-5 (3+1) are formed from splits S2 through SK respectively of drives 150a through 150d.

Figure 4:
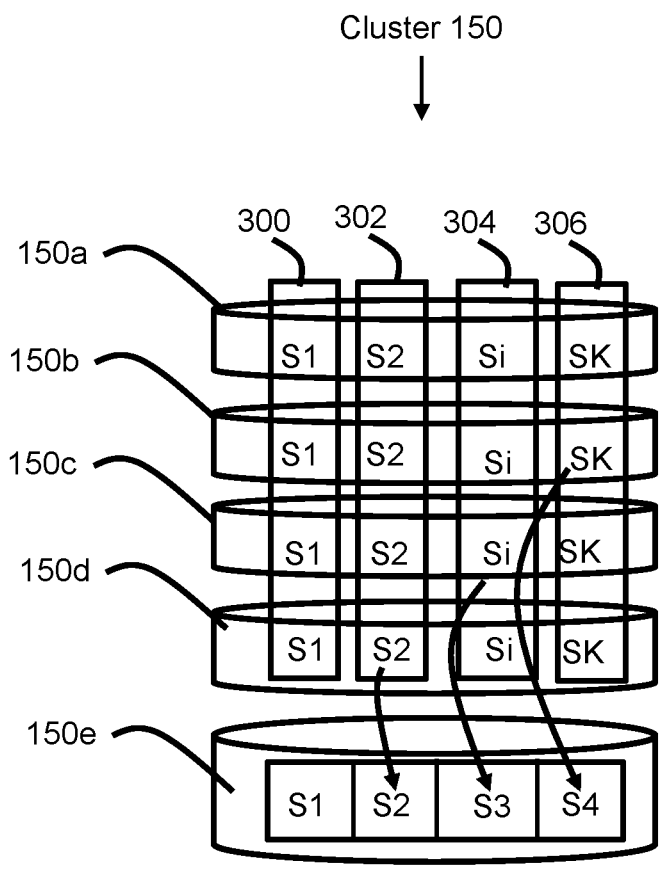
FIG. 4 illustrates scaling-up of the cluster by a single drive.

FIG. 4 illustrates scaling-up of the cluster 150 by a single drive. New drive 150e is added to the cluster. The new drive 150e is organized into the same number M*K=4 of splits as drives 150a through 150d, and the splits are indexed as S1-SK. Data/parity from a single selected split from each of all but one original drive and each of all but one of the existing protection groups, e.g. drives 150b through 150d and protection groups 302 through 306, is then redistributed. Redistribution may be accomplished by moving one split per row (2 to K) to new row (K+1). Each split moved to the new row comes from a different column, where each column represents a different protection group. "Redistributed" may mean copied or moved to the correspondingly indexed split of the new drive 150e. The data/parity to be moved may be selected from consecutively numbered split indices and drives to facilitate future scaling of the cluster. In the illustrated example the data/parity in splits S1 of drives 150a through 150d remains in place, the data/parity in split S2 of drive 150d is moved to split S2 of drive 150e, the data/parity in split Si of drive 150d is moved to split Si of drive 150e, and the data/parity in split SK of drive 150a is moved to split SK of drive 150e. The result is a diagonally-oriented group of vacated or empty splits in the example as illustrated. The diagonal orientation enables efficient addition of protection groups and drives in successive iterations of scaling.

Figure 5:
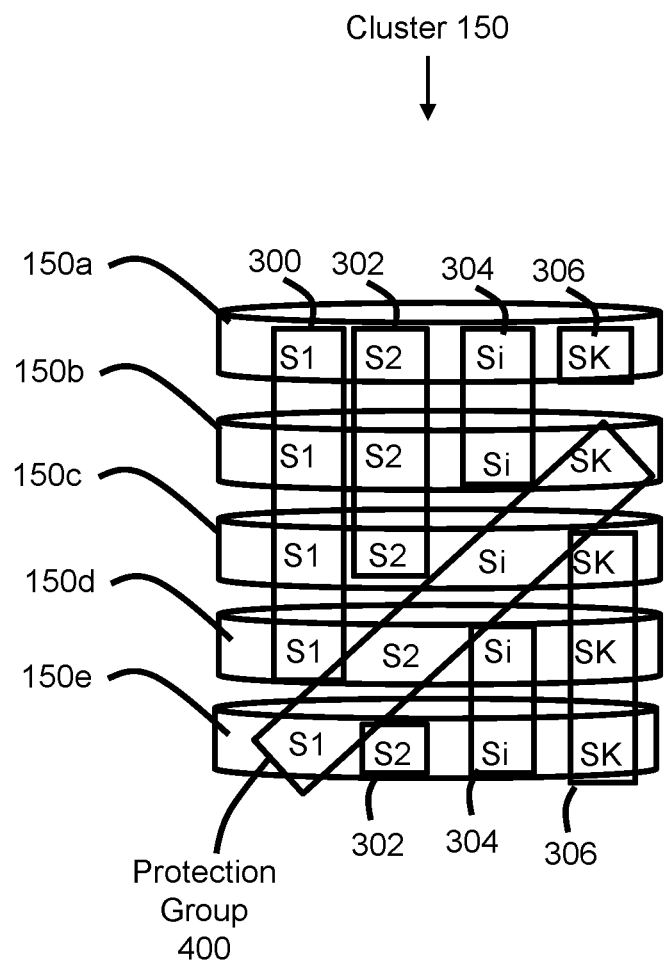
FIG. 5 illustrates creation of a new RAID protection group on the scaled-up cluster.

FIG. 5 illustrates creation of a new RAID-5 (3+1) protection group 400 on scaled-up cluster 150 using the diagonally-oriented splits made available by split redistribution. The new RAID-5 (3+1) protection group 400 includes splits S1, S2, Si, and SK of drives 150e, 150d, 150c, and 150b respectively. RAID protection group 300 is unchanged because it still includes splits S1 of original drives 150a through 150d. RAID protection group 302 includes splits S2 of drives 150a, 150b, 150c, and 150e after redistribution. RAID protection group 304 includes splits S1 of drives 150a, 150b, 150d, and 150e after redistribution. RAID protection group 306 includes splits SK of drives 150a, 150c, 150d, and 150e after redistribution. By redistributing splits in the described manner, the RAID-protected cluster 150 is thereby scaled-up by a single drive rather than by R+P drives. It should be understood, however, that the scaling technique may be applied to scale-up a cluster by multiple drives, by multiple protection groups, and be used with other RAID levels. Moreover, as will be described below, multiple splits per drive may be redistributed in a single scaling iteration.

Figure 6:
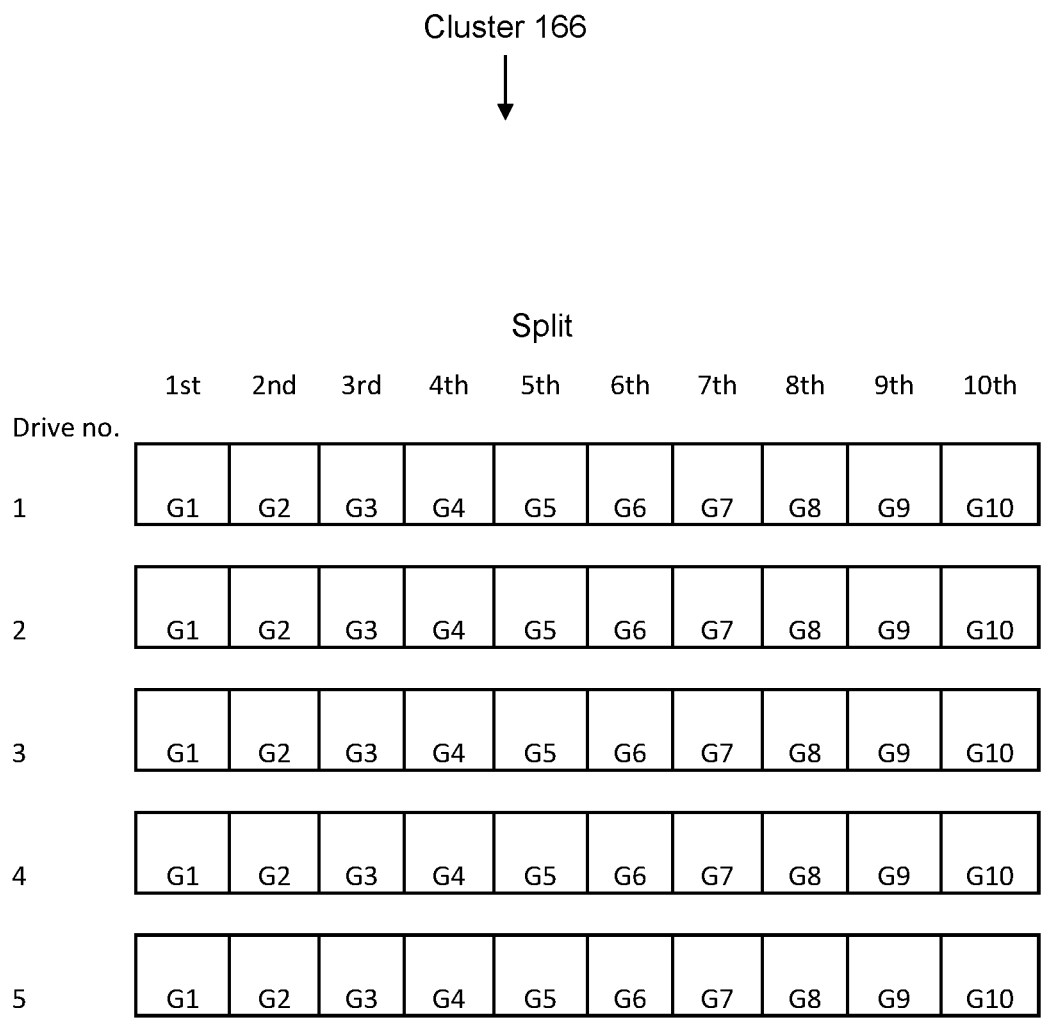
FIGS. 6 through 10 illustrate scaling of a cluster that implements RAID 5 (4+1) and initially includes five drives with M*K=2*5 splits per drive.

FIG. 6 illustrates cluster 166 (FIG. 1) implementing RAID 5 (4+1) with five drives with ten splits per drive. Each protection group includes similarly numbered members GX and is created using five splits that are distributed across five drives, i.e. one split per drive. There are ten protection groups, in each of which the respective members G1-G10 are vertically oriented as columns in the illustrated 10×5 matrix. Hereafter, GX will be used to refer to both members of protection group X and protection group X, where X is the integer number associated with the protection group.

Figure 7:
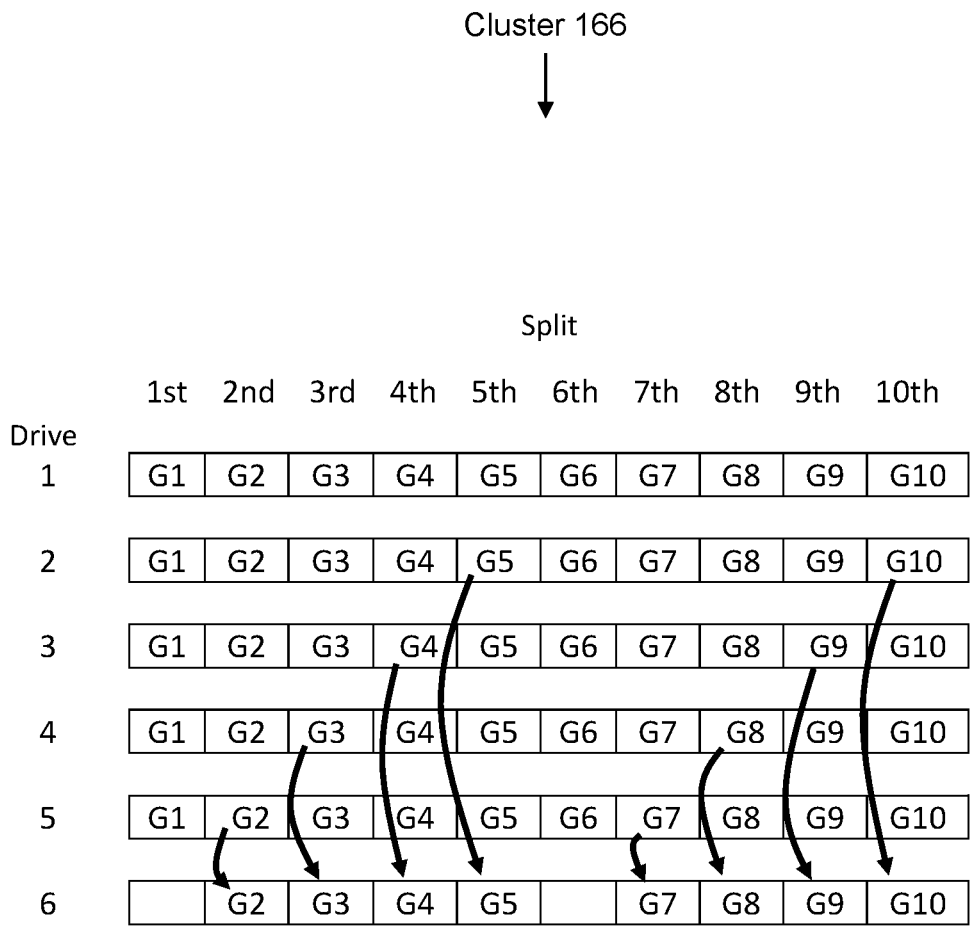

FIG. 7 illustrates scaling-up of the cluster of FIG. 6. A new drive (drive number 6) is added to the cluster 166. Eight splits selected from protection groups G2-G5 and G7-G10 on drives numbered 2-5 are redistributed to the new drive. The splits are selected from consecutively numbered drives and split indices such that two diagonally-oriented groups of splits are freed in the illustrated example. The first and sixth splits on the new drive are reserved. Consequently, two splits per drive of each of all but one of the original drives are redistributed. Moreover, none of the splits of drive number 1 are redistributed and none of the splits of protection group G6 are redistributed.

Figure 8:
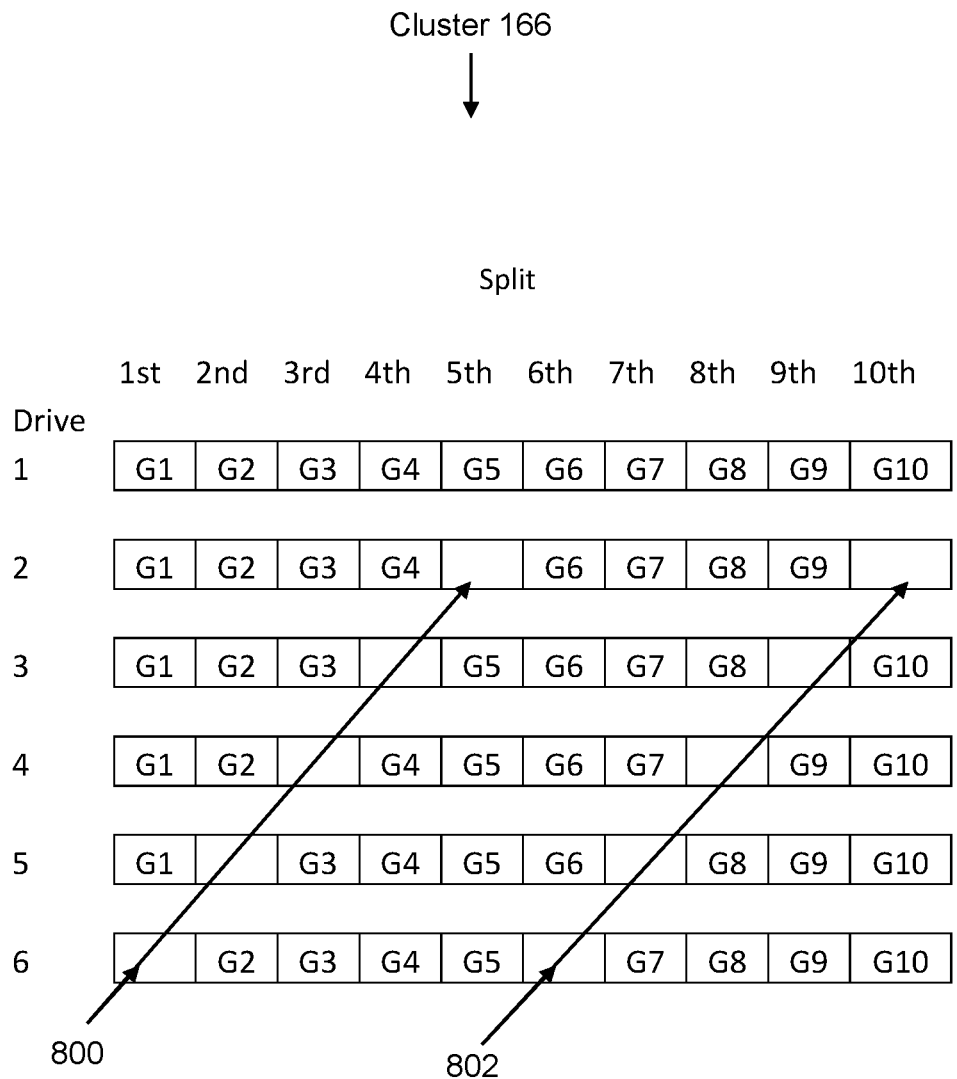

FIG. 8 illustrates the two diagonally-oriented groups 800, 802 of free splits that are created by redistribution as described with reference to FIG. 7. There are ten empty splits in total, including two groups of five splits each. Eight splits are freed by redistribution and two free splits are on the newly added sixth drive.

Figure 9:
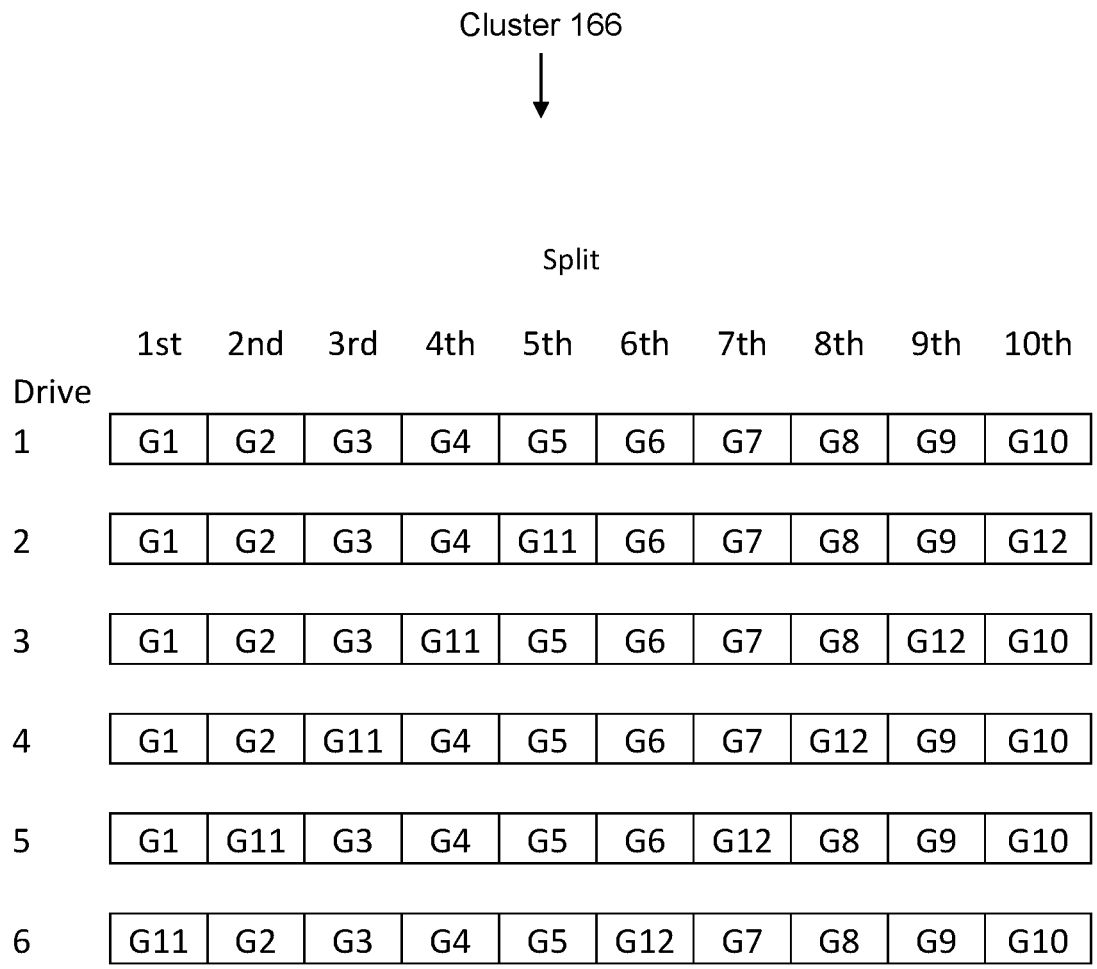

Referring to FIG. 9, the free splits allow creation of two additional protection groups G11 and G12. These new protection groups are not vertically oriented. Instead, the new protection groups may be visualized as diagonally-oriented within two 5×6 matrices. The first matrix comprises splits 1-5 of drives 1-6. The second matrix comprises splits 6-10 of drives 1-6. The original protection groups remain vertically oriented (one per column).

Figure 10:
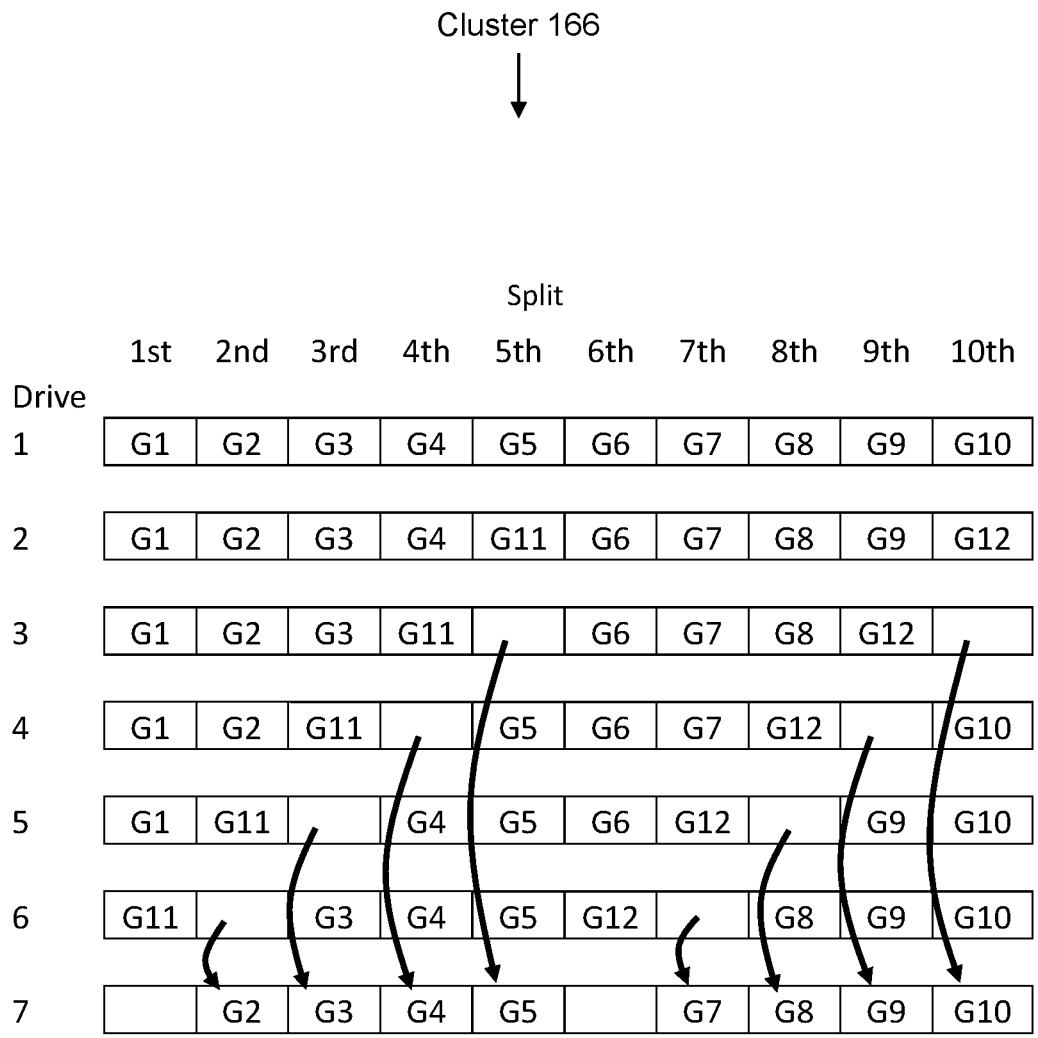

Referring to FIG. 10, in a subsequent iteration of scaling a seventh drive (drive number 7) is added to cluster 166. Redistribution of splits is performed in a manner like that already described above. Eight splits selected from protection groups G2-G5 and G7-G10 on the drives numbered 2-5 are redistributed to the new drive. The splits are selected from consecutively numbered drives and split indices such that two diagonally-oriented groups of splits are freed. The first and sixth splits on the new drive are reserved. Consequently, two splits per drive of each of all but two of the original drives are redistributed. None of the splits of drive number 1 and drive number 2 are redistributed and none of the splits of protection groups G1 and G6 are redistributed. In each successive iteration splits are redistributed after a new drive is added, thereby creating free splits for one more protection group along the diagonal of each matrix. Therefore, cluster capacity expansion will cause more protection groups to be created along the diagonals. The upper-left triangle of splits remains unchanged. The lower-right triangle of splits migrates to the new drives.

Figure 11:
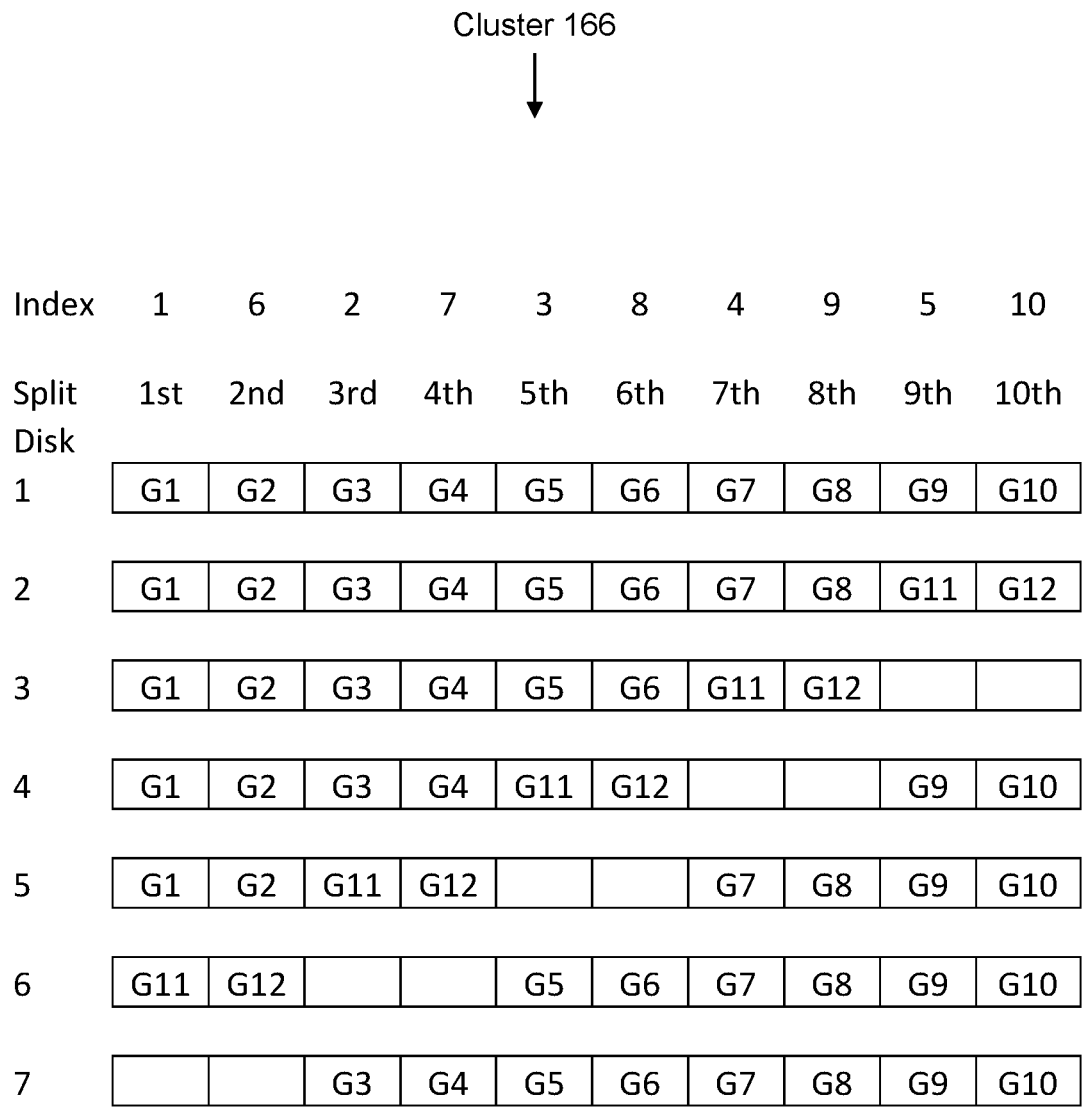
FIG. 11 illustrates conceptual matrices of a cluster with splits that are indexed in a predictable predetermined non-consecutive order.

Referring to FIG. 11, the conceptual matrices of cluster 166 may comprise splits that are indexed in a predictable predetermined non-consecutive order, e.g. a pattern. The split index numbers may be ascending, descending, consecutive, or interleaved. For example, a matrix may comprise every other split, such as 1st, 3rd, 5th, 7th and 9th splits. The next matrix may comprise 2nd, 4th, 6th, 8th and 10th splits. As a result, the following example and the previous example will have the same conceptual matrices.

Figure 12:
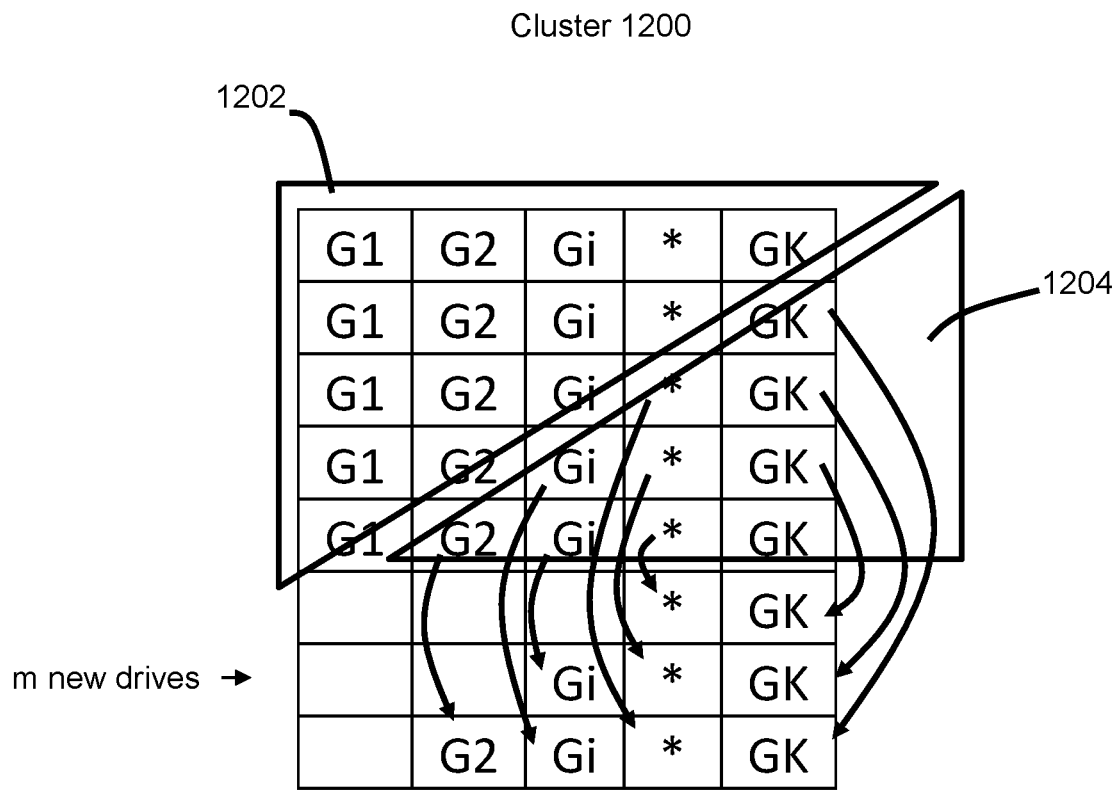
FIGS. 12 and 13 illustrate generalized cluster scaling.
Figure 13:
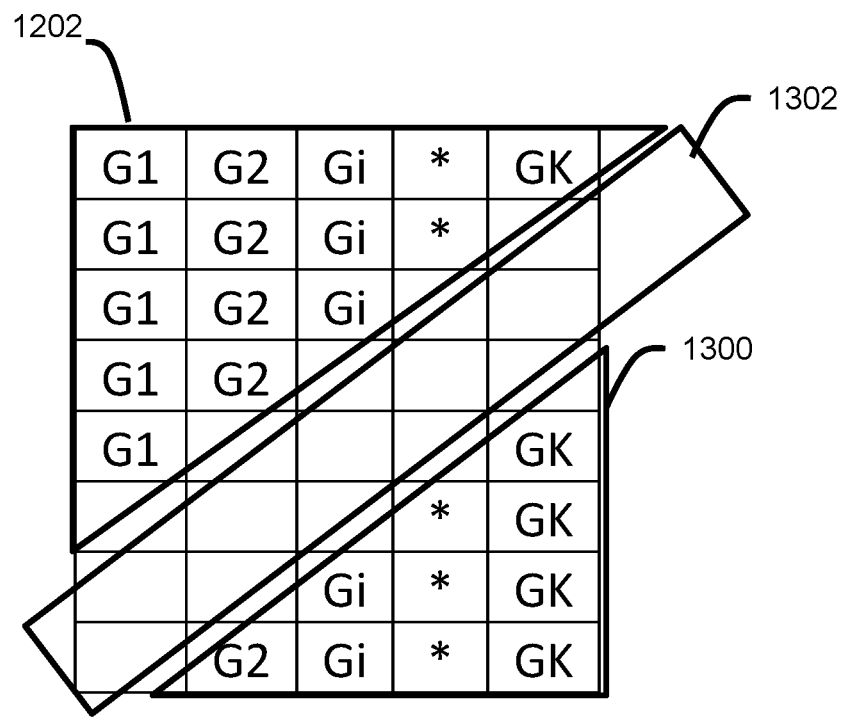

FIGS. 12 and 13 illustrate generalized cluster scaling. A cluster 1200 initially includes conceptual matrices with an upper-left triangle 1202 and a lower-right triangle 1204. After m new drives are added and splits from the lower-right triangle 1204 are moved to the new drives, space is created for m new diagonally-oriented protection groups. The scaled-up cluster includes conceptual matrices with three parts per matrix: the upper-left triangle 1202, a lower-right triangle 1300 and a diagonal 1302. The upper-left triangle does not move. Splits of the lower-right triangle are organized into diagonals of K−1 to K−m splits. Each diagonal is moved to a new drive. The longest diagonal with (K−1) splits from groups G2 to GK is moved to drive K+m. Each group member Gi in the lower-right triangle will move just once, rather than multiple times (if the drives should be added one by one).

Referring again to FIG. 1, a drive array (e.g. all drives in a drive array enclosure or all drives managed by a storage array) may alternatively or also be scaled-up by adding new clusters, e.g. new clusters 180, 182. Assuming implementation of a RAID in which each protection group has K=(R+P) members, up to Q new clusters can be created from N new drives where Q=N/K. Each new cluster may initially contain K=(R+P) drives with all protection groups distributed vertically. If N/K is not an integer value, then the remainder M new drives (Where N=Q*K+M) are added to existing clusters as described above. It may be preferable to create new clusters when possible, and scale existing clusters when new clusters cannot be created.

Figure 14:
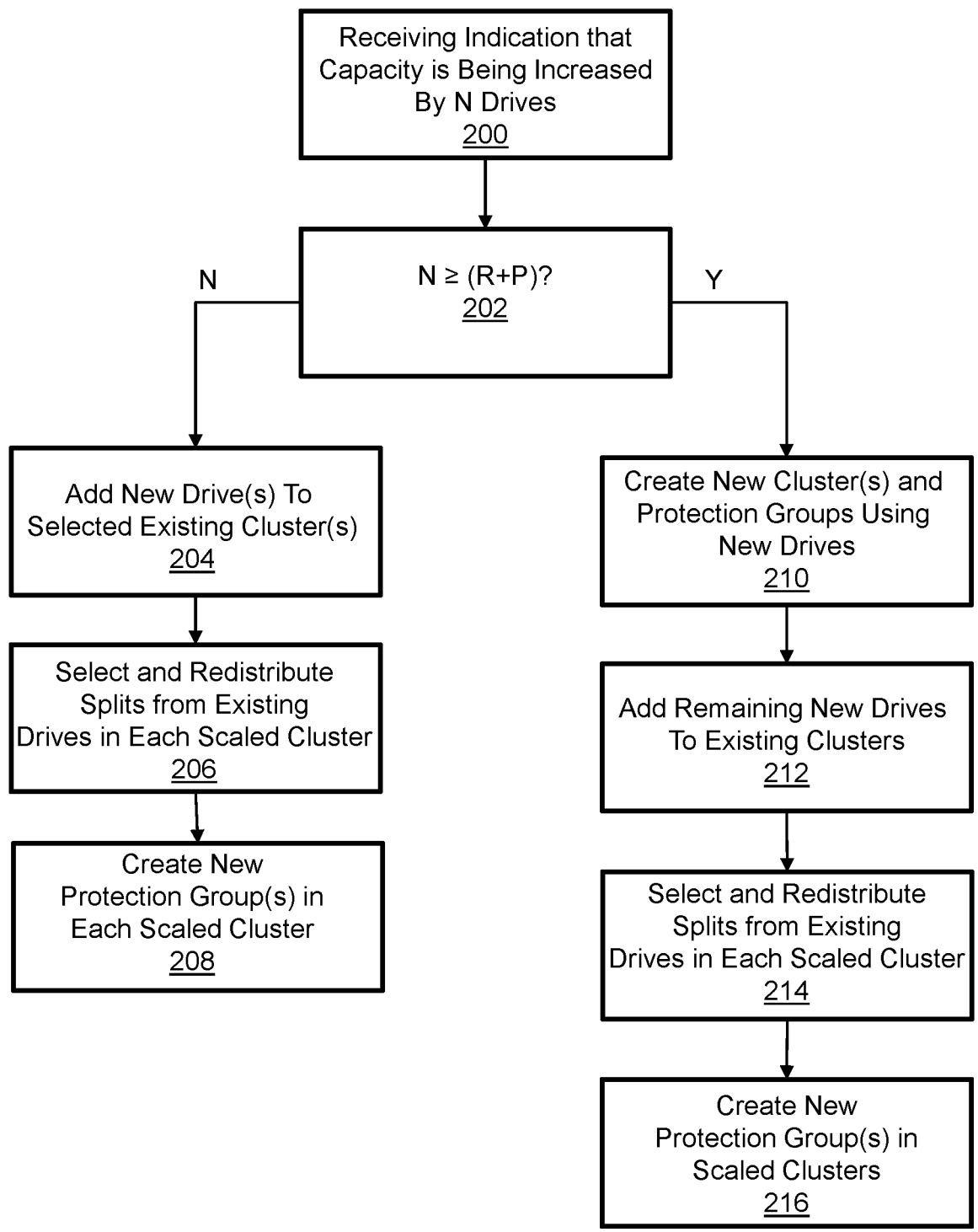
FIG. 14 illustrates a method for scaling RAID-based storage by redistributing splits.

FIG. 14 illustrates a method for scaling RAID-based storage by redistributing splits. The method may be implemented with a computer program running on the storage array, for example and without limitation. The storage system is assumed to be configured such that a selected RAID level is implemented by the managed drives, the managed drives are organized into M*K splits, and the members of each RAID protection group are splits. Step 200 is receiving an indication that storage capacity is being increased by N drives. The storage array may not have control over how many new drives are added but the indication enables the storage array to implement steps to configure how the new drives are utilized. Step 202 helps to determine whether to scale selected individual clusters or the entire array. If N is less than (R+P) then there is an insufficient number of new drives to create a new cluster. In that case step 204 is adding the N new drives to a selected subset of the existing clusters. The N new drives may be distributed among the existing clusters in a variety of different ways. For example, the new drives could be distributed in a manner that minimizes the differences in numbers of drives between clusters, e.g. by selecting the clusters with the fewest drives as recipients of individual new drives. The selected clusters are then scaled-up. Step 206 is selecting splits and redistributing the data/parity in those splits from the existing drives of the selected clusters to the new drives allocated thereto. As explained above, selection of splits may be made in a predetermined pattern to facilitate addition of more new drives and protection groups in subsequent iterations. The redistribution creates free splits that are used with the splits of the new drives to create at least one new protection group in each scaled-up cluster in step 208.

If N is greater than or equal to (R+P) as determined in step 202 then there are enough new drives to create at least one new cluster. Step 210 is to create new cluster(s) and protection groups using the new drives. Each new cluster may have R+P new drives. The new drives are organized into M*K splits (the same number as the existing drives) and new protection groups are created. Assuming implementation of a RAID in which each protection group has (R+P) members, N new drives may be used to create Q new clusters where N=Q(R+P) and each new cluster contains K=(R+P) new drives. If N/K is not an integer, then the remainder drives may be added to existing clusters in step 212. The remainder new drives may be distributed among the existing clusters in a variety of different ways. For example, the remainder new drives could be distributed in a manner that minimizes the differences in numbers of drives between clusters, e.g. by selecting clusters with the fewest drives as recipients of individual new drives or distributing the new drives equally among existing clusters having an equal number of existing drives. Step 214 is to select splits and redistribute the associated data/parity from the existing drives in each scaled cluster. As explained above, selection may be made in a predetermined pattern to facilitate addition of more drives and protection groups in subsequent iterations. The redistribution creates free splits that are used to create at least one new protection group in each cluster as indicated in step 216.

In accordance with the above description, an array may expand by one or multiple clusters of drives at a time and the capacity of each drive cluster may expand by a single drive or multiple drives at a time. Therefore, array capacity expansion is more flexible and granular than existing (R+P) drive scaling.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
at least one computing node comprising a processor and non-transitory memory;
clusters of drives that are managed by the at least one computing node; and
computer program code on the non-transitory memory, executed by the processor, comprising:
instructions that organize each of the drives into a plurality of splits, wherein each split is a fixed-size amount of storage capacity, and all splits have equal storage capacity;
instructions that implement a selected RAID (Redundant Array of Independent Drives) level using a first number of the splits as RAID protection group members, where the first number indicates how many members are in each protection group of the RAID level;
instructions that scale RAID storage capacity in response to addition of a second number of new drives, comprising:
instructions that create one or more new clusters, each of the new clusters comprising the first number of the new drives, leaving a third number of remaining new drives, where the third number is less than the first number;
instructions that add the remaining new drives to a selected cluster, comprising:
instructions that select splits of drives of the selected cluster and redistribute the selected splits to the remaining new drives added to the selected cluster; and
instructions that create at least one new protection group in the selected cluster using at least some splits freed by redistribution of the selected splits to the remaining new drives added to the selected cluster.

2. The apparatus of claim 1 wherein the instructions that scale RAID storage capacity create a maximum possible number of new clusters from the second number of new drives.

3. The apparatus of claim 2 wherein the instructions that add the remaining new drives to the selected cluster add only drives remaining from drives allocated for creation of the maximum possible number of new clusters from the second number of new drives.

4. The apparatus of claim 1 wherein the instructions that add the remaining the new drives to the selected cluster operate to select the cluster to minimizes differences in numbers of drives between clusters.

5. The apparatus of claim 1 wherein the instructions that add fewer than the first number of the new drives to the selected cluster add a single new drive to the selected cluster.

6. The apparatus of claim 1 wherein the selected cluster initially includes conceptual matrices with an upper-left triangle and a lower-right triangle, and after m new drives are added to the selected cluster and splits from the lower-right triangle are redistributed to the m new drives, space is created for m new protection groups in a diagonal conceptual matrix.

7. A method, comprising:
organizing individual storage drives into a plurality of splits, wherein each split is a fixed-size amount of storage capacity and all splits have equal storage capacity;
implementing a selected RAID (Redundant Array of Independent Drives) level using a first number of the splits as RAID protection group members, where the first number indicates how many members are in each protection group of the RAID level;
scaling RAID storage capacity in response to addition of a second number of new drives, comprising:
creating one or more new clusters, each of the new clusters comprising the first number of the new drives, leaving a third number of remaining new drives, where the third number is less than the first number;
adding the remaining new drives to a selected cluster of drives;

selecting splits of drives of the selected cluster and redistributing the selected splits to the remaining new drives added to the selected cluster; and creating at least one new protection group in the selected cluster using at least some splits freed by redistribution of the selected splits to the remaining new drives added to the selected cluster.

8. The method of claim 7 comprising creating a maximum possible number of new clusters from the second number of new drives.

9. The method of claim 8 comprising adding to the selected cluster only drives remaining from the second number of new drives minus the new drives allocated for creating the maximum possible number of new clusters from the second number of new drives.

10. The method of claim 7 comprising selecting the cluster to minimizes differences in numbers of drives between clusters.

11. The method of claim 7 comprising adding a single new drive to the selected cluster.

12. The apparatus of claim 7 wherein the selected cluster initially includes conceptual matrices with an upper-left triangle and a lower-right triangle and, after m new drives are added to the selected cluster, redistributing splits from the lower-right triangle to the m new drives to create space for m new protection groups in a diagonal conceptual matrix.

13. A scalable storage array, comprising:

clusters of drives that are each organized into a plurality of splits, wherein each split is a fixed-size amount of storage capacity and all splits have equal storage capacity, a selected RAID (Redundant Array of Independent Drives) level using a first number of the splits as RAID protection group members, where the first number indicates how many members are in each protection group of the RAID level; and at least one computing node that scales RAID storage capacity in response to addition of a second number of new drives by creating one or more new clusters, each of the new clusters comprising the first number of the new drives, leaving a third number of remaining new drives, where the third number is less than the first number; adding the remaining new drives to a selected cluster of drives; selecting splits of drives of the selected cluster and redistributing the selected splits to the remaining new drives added to the selected cluster, and creating at least one new protection group in the selected cluster using at least some splits freed by redistribution of the selected splits to the remaining the new drives added to the selected cluster.

14. The scalable storage array of claim 13 wherein the at least one computing node creates a maximum possible number of new clusters from the second number of new drives.

15. The scalable storage array of claim 14 wherein the at least one computing node adds only drives remaining from drives allocated for creation of the maximum possible number of new clusters from the second number of new drives.

16. The scalable storage array of claim 13 wherein the at least one computing node selects the cluster to minimizes differences in numbers of drives between clusters.

17. The scalable storage array of claim 13 wherein the at least one computing node adds a single new drive to the selected cluster.

* * * * *